(12) United States Patent
Paul et al.

(10) Patent No.: US 7,215,454 B2
(45) Date of Patent: May 8, 2007

(54) DEVICE FOR SUBSTRATE TREATMENT BY MEANS OF LASER RADIATION

(75) Inventors: Helmut Paul, Dachau (DE); Walter Herrmann, Munich (DE)

(73) Assignee: MLT Micro Laser Technology GmbH, Kirchheim (DE)

( * ) Notice: Subject to any disclaimer, the term of this patent is extended or adjusted under 35 U.S.C. 154(b) by 62 days.

(21) Appl. No.: 10/494,082

(22) PCT Filed: Sep. 27, 2002

(86) PCT No.: PCT/EP02/10892

§ 371 (c)(1), (2), (4) Date: Sep. 24, 2004

(87) PCT Pub. No.: WO03/039803

PCT Pub. Date: May 15, 2003

(65) Prior Publication Data

US 2005/0087295 A1    Apr. 28, 2005

(30) Foreign Application Priority Data

Nov. 7, 2001    (DE) .............................. 101 54 508

(51) Int. Cl.
G02B 26/08    (2006.01)
(52) U.S. Cl. .................................... 359/216
(58) Field of Classification Search ................. 359/216
See application file for complete search history.

(56) References Cited

U.S. PATENT DOCUMENTS 4,378,480 A    3/1983    Langhans

| 4,537,465 A | * | 8/1985 | Sherman et al. ............ 359/203 |
| 5,861,977 A | | 1/1999 | Harrigan et al. |
| 5,867,298 A | | 2/1999 | Harrigan et al. |
| 6,023,059 A | * | 2/2000 | Blanding .................... 250/234 |
| 6,292,285 B1 | | 9/2001 | Wang et al. |

FOREIGN PATENT DOCUMENTS

| DE | 2918283 A1 | 3/1981 |
| DE | 2918283 C2 | 4/1983 |
| DE | 3728660 A1 | 3/1989 |
| DE | 19807761 A1 | 8/1998 |
| DE | 10105878 A1 | 9/2002 |
| EP | 0549357 A1 | 6/1993 |
| EP | 1119437 B1 | 8/2000 |
| EP | 0 549 357 A1 | 6/2005 |
| JP | 01316415 A | 12/1989 |
| WO | WO 80/02393 A1 | 11/1980 |

* cited by examiner

*Primary Examiner*—Euncha P. Cherry
(74) *Attorney, Agent, or Firm*—Townsend and Townsend and Crew LLP

(57) ABSTRACT

An apparatus for substrate treatment by means of laser radiation includes a rotating polygonal mirror by which at least one incident laser beam is reflected and is pivotable across an arrangement of converging lenses which lie next to one another and which are arranged at a spacing from the substrate corresponding precisely or approximately to their focal lengths. The rotating polygonal mirror is divided into at least two regions having a different number of facets and is adjustable such that different regions can be introduced into the beam path of the laser radiation and accordingly different sweep angles or fan angles of the laser beam reflected by the rotating polygonal mirror can be set.

24 Claims, 6 Drawing Sheets

DEVICE FOR SUBSTRATE TREATMENT BY MEANS OF LASER RADIATION

BACKGROUND OF THE INVENTION

The invention relates to an apparatus for substrate treatment by means of laser radiation comprising a rotating polygonal mirror by which at least one incident laser beam is reflected and is pivotable across an arrangement of converging lenses which lie next to one another and which are arranged at a spacing from the substrate corresponding to their focal lengths.

Such an apparatus is in particular used for the working of, for example, band-shaped materials by means of laser radiation, with the laser light being split into a plurality of quasi-simultaneous working positions and short pulses of very high frequency simultaneously being produced from the continuous light of the laser. The high pulse repetition rate results in correspondingly high working speeds.

A beam splitting by so-called beam splitters would be disadvantageous in that the resulting part beams would have a correspondingly lower intensity which is not sufficient for specific working processes. The part beams would moreover also have a changing intensity, i.e. in any case a different intensity and/or spatial intensity distribution. The main problem with beam splitters is thus frequently the different influencing of the beam profile, in particular in the event of contamination (beam geometry).

When perforating paper by means of laser light beams, for example, it is absolutely necessary for the achieving of a uniform hole size and quality to ensure a specific, relatively high and constant intensity of the laser light beam carrying out the perforation. A beam splitting would thus again also be unfavorable here.

Apparatuses of the initially named kind (cf. e.g. DE-C-2918283) are in particular used for the perforation of thin papers such as cigarette tipping paper. The apparatus in each case produces a track of small holes per working head in this process, with the continuous light of the laser being chopped into individual pulsed beams with the help of an optical multiplexer. Every focused laser pulse evaporates the thin material instantaneously and thus produces a hole with a customary diameter of, for example, approximately 60 to approximately 150 µm. A respective apparatus can e.g. have 16 working heads and can thus perforate paper with, for example, four perforation zones each having four rows of holes and a width complementary thereto of approximately 150 mm at a web speed of several 100 m/min. The perforation is accordingly concentrated on a few zones transversely to the web and is arranged very densely in the longitudinal direction.

In practice, it is continually necessary to change the number of facets. For this purpose, up to now, the balanced polygon completely assembled with the drive motor has had to be replaced and the new polygon has to be adjusted again. This process, which takes several hours, is irritating for the end customer since only experienced and trained personnel can carry out the respective error-prone work. In practice, this has the result that a replacement of the polygon is only carried out reluctantly and very rarely.

However, the sweep angle or fan angle of the reflected laser beam and thus the number of the exposed and thus perforating individual beams can be changed by a respective polygon replacement and a correspondingly changed number of facets. As a rule, this is a question of the optimization of production speed. If, for example, only eight beams are required, i.e. for example eight perforation tracks, and if the respective machine is fitted with a polygon which, for example, exposes all sixteen individual paths present, eight of the sixteen beam paths at once have to be blocked if there is no conversion to a correspondingly different polygon. Fifty percent of the original laser energy is thus not available for the working. To block or suppress individual beams, the previously customary perforation machines of the corresponding type are provided with so-called single-beam shutters, i.e. for example with sixteen such shutters.

If the production quantity to be produced by the end user is very high and if the production time available for the respective production product amounts, for example, to several weeks, in practice, the time-consuming conversion to a polygon will previously have been selected which fans the laser light only to the e.g. eight beams required in order to utilize the available laser energy.

SUMMARY OF THE INVENTION

It is a general underlying object of the invention to provide a user-friendly apparatus, i.e. in particular a switchable apparatus, of the initially named kind in which, optionally, a very fast change of the density of the perforation is possible.

One aim of the invention is to provide an improved apparatus of the initially named kind which permits a faster change of the number of facets and accordingly of the sweep angle or fan angle of the reflected laser beam with an effort reduced to a minimum. In this process, a respective change should in particular also be possible during the operation of the apparatus.

This aim is achieved in accordance with the invention in that the rotating polygonal mirror is divided into at least two regions having a different number of facets and in that the rotating polygonal mirror is adjustable such that different regions can be introduced into the beam path of the laser radiation and accordingly different sweep angles or fan angles of the laser beam reflected by the rotating polygonal mirror can be set.

It is, for example, possible on the basis of this design to switch between two or more polygonal mirror regions differing with respect to their number of facets with minimum effort very quickly and practically during production. In this process, the rotating polygonal mirror can in particular be adjustable by means of a positioning device actuatable by motor or manually.

A preferred practical embodiment of the apparatus in accordance with the invention is characterized in that the regions having a different number of facets are arranged behind one another in the direction of the axis of rotation of the rotating polygonal mirror and in that the rotating polygonal mirror is adjustable in the direction of this axis of rotation.

The rotating polygonal mirror can be assembled, for example, from plates by which the regions having a different number of facets are formed. A freely configurable multi-polygonal optical system thus results in which, for example, different polygons can be combined in the manner of dumbbell weights. Two or three or even more different polygons can thus be combined with one another, for example.

Generally, however, a design of the rotating polygonal mirror in one piece is also conceivable, with the regions differing with respect to their number of facets being formed by corresponding sections of this one-piece rotating polygonal mirror.

A preferred practical embodiment of the apparatus in accordance with the invention is characterized in that the incident laser beam is focused onto the rotating polygonal mirror by a lens and in that a further arrangement of converging lenses, which lie next to one another and which are arranged at a spacing from the rotating polygonal mirror corresponding precisely or approximately to their focal lengths, is provided between the rotating polygonal mirror and the arrangement of converging lenses lying next to one another and arranged at a spacing from the substrate corresponding precisely or approximately to their focal lengths.

The lenses between which the rotating polygonal mirror lies can e.g. be spherical and/or cylindrical converging lenses. Spherical lenses have the advantage in this process that the required reflection area/reflection width on the polygon and thus the weight and accordingly the mass of inertia can be kept small.

Deflection mirrors can be arranged between the two arrangements of converging lenses lying next to one another.

An advantageous embodiment is characterized in that the regions having a different numbers of facets have at least partly differing axes of rotation and/or in that at least partly differing drives are associated with these regions.

The different polygons therefore do not necessarily have to be arranged on a single axis, which normally brings about a lower material effort. They can rather also be located on two or more axes or drives. A kind of revolver solution with a manual or electrical positioning of different polygon drives, similar to a tool revolver, can be realized by a corresponding arrangement and by mechanical or motorized adjustment units such as e.g. two drives disposed opposite one another on a common moving table and/or by a rotational apparatus with a mechanical or motorized stop.

It is also of advantage in many cases if the axis of rotation of the rotating polygonal mirror or of a respective mirror region is tilted with respect to the plane perpendicular to the incident laser beam.

The fan angle of the beam multiplexer can thus be adjusted via a motor or manual positioning device practically in ongoing operation, e.g. within seconds, and thus a different number of perforation beams can be set so-to-say by "pressing a button" with a simultaneous utilization of the laser energy by means of a special polygonal mirror which is divided into different regions and has a respective different number of facets in these regions.

In particular a fast adaptation of the exposed and so perforated beam paths or perforation tracks is possible when a rotating polygonal mirror having at least two regions having a different number of facets is used.

A further aim of the invention consists of providing an apparatus with extended adjustment possibilities in which in particular a multiplication of the perforation density within a respective perforation track and/or the increase of the perforation density, e.g. by producing additional, slightly offset tracks, i.e. by a quasi-multiplication of tracks, is also possible in a manner which is as simple as possible.

This aim is achieved in accordance with the invention by an apparatus for substrate treatment by means of laser radiation comprising a rotating polygonal mirror by which a first incident laser beam is reflected and is pivotable across an arrangement of converging lenses which lie next to one another and which are arranged at a spacing from the substrate corresponding to their focal lengths, in particular in accordance with any one of the preceding embodiments, with the apparatus being characterized in that at least one further incident laser beam can be reflected via the rotating polygonal mirror in order to correspondingly increase the number of the perforation tracks produced in the substrate and/or the perforation density in a respective perforation track.

In particular a multiplication of the number of holes is possible on the basis of this design without any effort or with at most a low effort of additional optical components. Only at least one further laser beam must be reflected into the system.

There is advantageously a switching possibility between different modes of operation of a different number of reflected laser beams.

In this process, the laser beams reflected via the rotating polygonal mirror can, for example, lie at least partly in a common sweep plane or fan plane adjoining the rotating polygonal mirror.

It can, however, also again be of advantage in specific cases for the axis of rotation of the rotating polygonal mirror or of a respective mirror region to be tilted. A preferred embodiment of the apparatus in accordance with the invention is correspondingly characterized in that at least some of the incident laser beams form a plane which is tilted with respect to the plane of the respective laser beams reflected at the rotating polygonal mirror.

Such an embodiment brings about the advantage inter alia that the different incident laser beams can be arranged better and the respective beam paths are more easily adjustable. The axis of rotation of the polygon can thus, for example, be tilted by an angle $\alpha$, which has the consequence that the plane in which the incoming laser beams are located emerges from the fan plane of the beams reflected by the polygon at an angle $2\alpha$. A more compact arrangement can thus be realized overall.

The different incident laser beams can be incident at least partly at different reflection points of the rotating polygonal mirror.

The reflection points at which the incident laser beams are incident on the rotating polygonal mirror are preferably adjustable.

The perforation spacing in a respective perforation track, for example, is advantageously adjustable via these reflection points.

In addition to a first laser beam, at least one further laser beam can thus be reflected. The further laser beam(s) can be located in the same beam plane which is formed by the first incident laser beam and the beam fan set up by the rotating polygonal mirror. In this process, a second beam can, for example, be arranged in mirror symmetry to the first. Depending on the set reflection point or point of incidence, an offset of the instantaneously exposed or swept collimator lenses results for each incident beam which can generally lie between 0° and the full fan angle. The further incident laser beam(s) can thus also use the beam multiplexer formed by the rotating polygonal mirror without any further effort, whereby a manually adjustable multiplication or a multiplication adjustable by motor, e.g. doubling, of the laser working pulses in time is achieved, considered for one single beam path. Perforation holes can thus be produced by one single beam path with a multiple number, e.g. double the number, and with an adjustable spacing.

A beam path must, however, accept a plurality of beams for the multiplication, e.g. doubling, of the number of holes, which pre-couples the adjustment possibilities (not independently adjustable). The increase in the hole frequency is, however, automatically synchronized with an adjustable spacing within a track. A switching is in particular also possible in operation. Such an embodiment is e.g. suitable as a hole doubler, in particular a hole multiplier, for a fixed number of tracks. In this case, as equally in all other cases, a corresponding control via software is conceivable.

In a further expedient embodiment of the apparatus in accordance with the invention, the number of facets of the rotating polygonal mirror has been selected such that only a respective part section of the arrangement of converging lenses lying next to one another and arranged at a spacing from the substrate corresponding to their focal lengths is swept over by a respective reflected laser beam, with the different reflected laser beams sweeping over different part sections of this lens arrangement.

In this process, the laser beams reflected via the rotating polygonal mirror can lie at least partly in a common sweep plane or fan plane adjoining the rotating polygonal mirror.

A rotating polygonal mirror can thus, for example, be used for sweeping over only half the number of the totally provided collimator lenses. The pulse frequency or hole frequency doubles due to the doubled number of facets with the same technically realizable maximum speed of rotation of the rotating polygonal mirror; however, only with half the number of perforation tracks. The total number of holes remains the same. The respective embodiment of the apparatus in accordance with the invention can now e.g. be used to compensate for this disadvantage by means of a second incident laser beam acting on one and the same rotating polygonal mirror and to achieve a real doubling or multiplying of the pulse frequency or of the perforation frequency for all beams by the use of the second or of the further laser beams.

The number of holes is accordingly multiplied or doubled, with the beams or the focusing lenses being adjustable independently of one another. A corresponding synchronization is achieved by the mutual adjustment of e.g. two beams on one track. The respective embodiment is therefore in particular suitable for a hole multiplication, e.g. for a hole doubling. The apparatus can in particular also be switched in operation. The respective control can in particular again take place via corresponding software.

In accordance with a further expedient practical embodiment of the apparatus in accordance with the invention, the laser beams reflected via the rotating polygonal mirror lie at least partly in different sweep planes or fan planes adjoining the rotating polygonal mirror.

At least two laser beams instead of only one single laser beam are again also reflected in this case via the rotating polygonal mirror serving as a beam multiplexer. The further laser beam(s) are now, however, no longer, or partly no longer located in the same beam plane which is set up by the first incoming laser beam and the beam reflected by the rotating polygonal mirror. In this respect, there is therefore an angular difference between the sweep planes or the fan planes of at least some of the beams. Each laser beam incident at a different angle sets up its own fan plane in a slightly angle tilted manner after reflection at the rotating polygonal mirror. As before, depending on the reflection point set, i.e. on the point of incidence of the incoming laser beams on the polygon surface, an offset of the instantaneously exposed or swept collimator lenses results for each incident beam which can lie in a region between 0° and the full fan angle. A second laser beam or further laser beams incident at a slightly tilted angle can thus also use the beam multiplexer without additional effort, whereby a manually adjustable multiplication or a multiplication adjustable by motor, e.g. doubling, of the laser working pulses is achieved, considered for one single beam path. Perforation holes can therefore be produced by one single beam path with a multiple number, e.g. double the number, and with an adjustable spacing. The multiplied holes are not arranged in line with the original row of perforations in dependence on slightly different angles of incidence and in dependence on the focal length of the focusing lens. The respective embodiment can thus rather be used for track multiplication, e.g. for track doubling.

It can be necessary for the better separation of the multiplied tracks, i.e. e.g. doubled tracks, for angular deviations in the range of several degrees to use larger diameters for the collimator lenses and deflection mirrors or for a plurality of collimator lenses, e.g. a second plane of the same collimator lenses, deflection mirrors and, optionally, also focusing lenses than for the first "normal beam" in order to accommodate the additional beam planes in space.

A multiplied, e.g. doubled, number of holes is thus possible, with beams and/or focusing lenses resulting which, depending on the design, can be adjusted separately or partly or only together. Synchronization results, depending on the version in multiplied, e.g. doubled, rows up to multiplied tracks with individually adjustable hole positions, if complete individual beams are set up which are adjustable fully independently for each additional optical fan after the reflection at the common rotating polygonal mirror. A universal design, which can in particular also be switched in operation, generally results with a minimum effort. The control can in particular take place via corresponding software.

It is generally conceivable that the motorized (electrical, pneumatic or the like) control is additionally supported by functions integrated in the software. Specific settings can thus be derived from a previously stored database. The advantage consists of the fact that the user does not have to know any technical adjustment parameters of the machine, but—e.g. by inputting end product data—leaves it to the apparatus or to the software to carry out the respectively suitable adjustment. Product parameters (e.g. total porosity, hole form or hole distribution and hole density) can accordingly be adjusted by the software, for example, without the customer having to know or calculate the precise technical adjustment parameters.

The invention will be explained in more detail in the following with reference to an embodiment and to the drawing.

DESCRIPTION OF THE PREFERRED EMBODIMENTS

Figure 1:
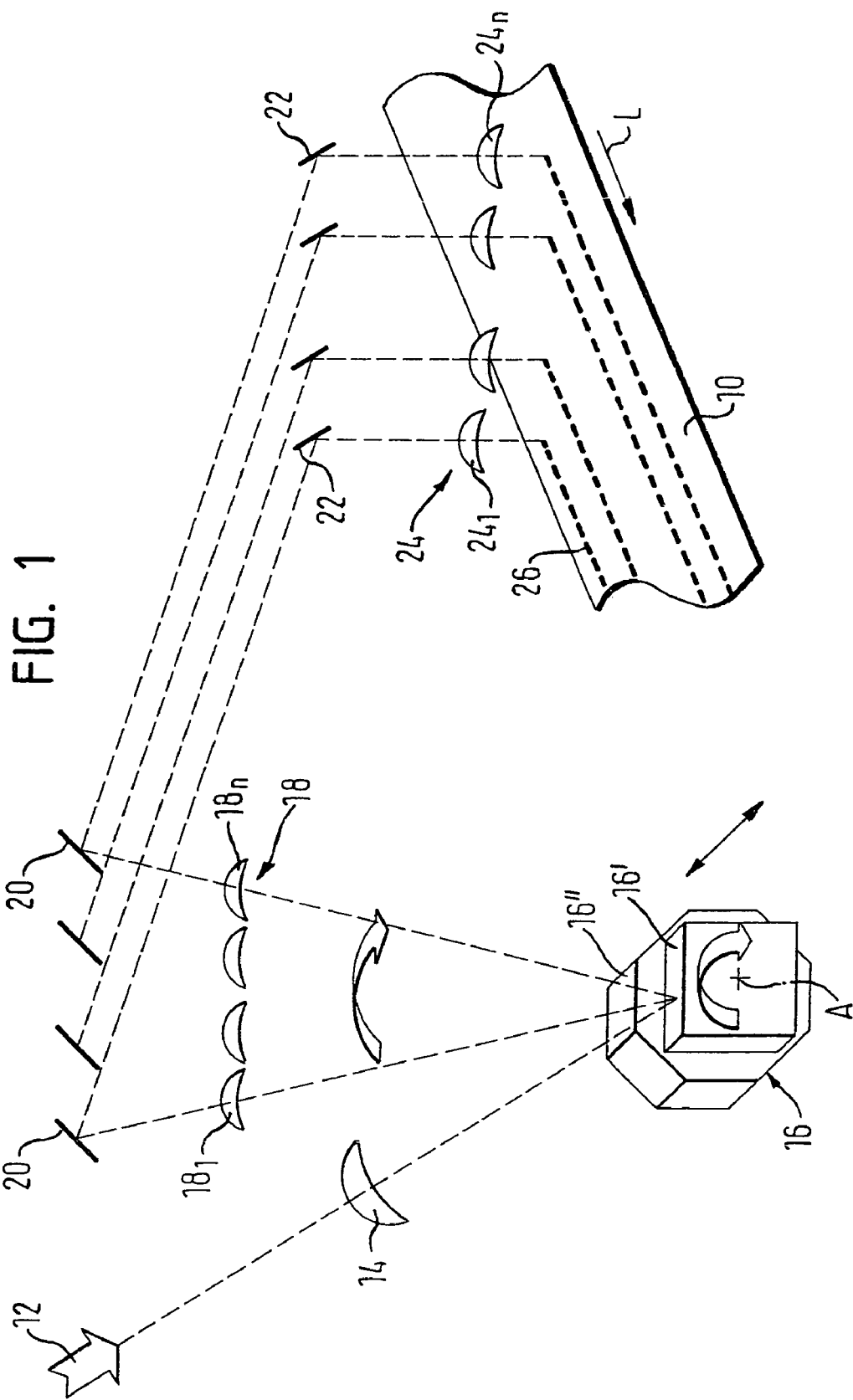
FIG. 1 is a schematic, simplified representation of an apparatus for substrate treatment by means of laser radiation, with the rotating polygonal mirror adopting such a position that all deflection mirrors are swept over.
Figure 2:
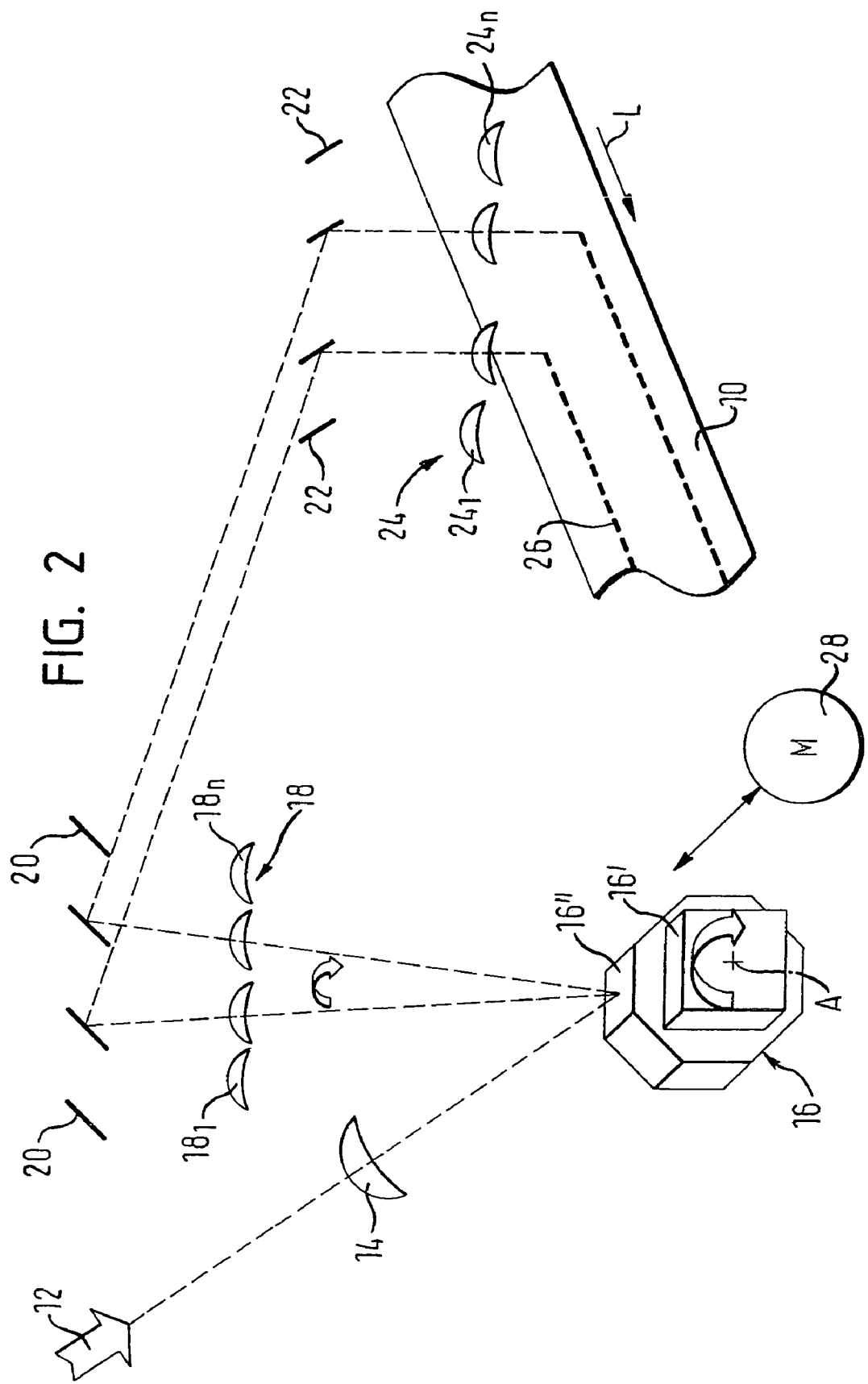
FIG. 2 shows the apparatus in accordance with FIG. 1, with the rotating polygonal mirror, however, adopting such a position that only some of the deflecting mirrors are swept over.

FIGS. 1 and 2 show in a schematic simplified representation an apparatus for treating a substrate 10, here a material web such as in particular a packing foil or a paper web moved in the transport direction L, by means of laser radiation. In this process, the light beam coming from a laser 12 passes through an inlet lens or converging lens 14 whose focal point or stripe plane lies on a surface of a rotating polygonal mirror 16 arranged in the beam path behind the converging lens 14.

The rotating polygonal mirror 16 is divided into a plurality of regions, here for example two regions 16', 16", having a different number of facets. In the present case, the region 16' has four facets, for example, and the region 16" has eight facets, for example.

The rotating polygonal mirror 16 is adjustable such that the different regions 16', 16" can be introduced into the beam path of the laser radiation and, accordingly, different sweep angles or fan angles of the laser beam reflected by the rotating polygonal mirror 16 are adjustable. In this process, the rotating polygonal mirror 16 can in particular be adjusted by means of a positioning device actuatable by motor or manually.

As can be recognized with reference to FIGS. 1 and 2, the regions 16', 16" having a different number of facets are arranged behind one another in the direction of the axis of rotation A of the rotating polygonal mirror 16. The rotating polygonal mirror 16 is accordingly adjustable in the direction of this axis of rotation A.

The rotating polygonal mirror 16 can be assembled, for example, from plates by which the regions 16', 16" having a different number of facets are formed. Generally, however, a one-piece design of the rotating polygonal mirror 16 is also conceivable.

In the present case, the region 16' has four facets, for example, and the region 16" has eight facets, for example.

Generally, however, a different number of facets is also conceivable. It also depends on the speed of rotation achievable with the rotating polygonal mirror 16 for a predetermined chopping frequency. In practice, different numbers of facets and the same maximum speed of rotation are thus used with the same polygon diameter. An important criterion in the selection of the facets or of the number of facets is the desired fan angle, i.e. the desired number of individual beams, which is the same as the number of perforation tracks.

When the rotating polygonal mirror 16 rotates, the incident reflected light ray or laser beam is pivoted about an arrangement 18 of collimator lenses or converging lenses $18_1$–$18_n$ lying next to one another. If the incident laser beam is incident on the next facet of the rotating polygonal mirror 16, the reflected beam jumps back and again sweeps over the respective angular region including the converging lenses $18_1$–$18_n$.

The converging lenses $18_1$–$18_n$ having the same focal length are arranged such that their focal points or their focal planes approximately or precisely coincide with the focal point or with the focal plane of the converging lens 14 on the rotating polygonal mirror 16. The light exiting the converging lenses $18_1$–$18_n$ is therefore again directed approximately parallel.

The converging lens 14 and the converging lenses $18_1$–$18_n$ can, for example, be provided as spherical and/or as cylindrical lenses.

The light rays exiting the lens arrangement 18 are directed in the present embodiment via deflection mirrors 20, 22 onto an arrangement of focusing lenses or converging lenses $24_1$–$24_n$ which lie next to one another and are arranged at a spacing from the substrate 10 approximately corresponding to their focal lengths. In this process, this lens arrangement 24 preferably includes spherical converging lenses $24_1$–$24_n$ which focus the light rays incident on them in parallel onto the substrate 10 lying behind the lens system 24 in the beam path. The size of the individual lenses $24_1$–$24_n$ of the lens system 24 preferably corresponds to the size of the individual lenses $18_1$–$18_n$ of the lens system 18 such that a corresponding section of the lenses $24_1$–$24_n$ is associated with each lens section of the lenses $18_1$–$18_n$.

In the present case, the number of converging lenses $18_1$–$18_n$, deflection mirrors 20, deflection mirrors 22 and converging lenses $24_1$–$24_n$ amounts to sixteen in each case.

In the representation in accordance with FIG. 1, the rotating polygonal mirror 16 adopts such a position that the incident laser beam is incident onto the region 16' of the rotating polygonal mirror 16 having four facets here, for example. Here, all sixteen converging lenses $18_1$–$18_n$ and deflection mirrors 20 are swept over. Accordingly, sixteen perforation tracks 26 result in the substrate 10.

In the representation in accordance with FIG. 2, the rotating polygonal mirror 16 is, however, positioned such that the incident laser beam is incident onto the region 16" having eight facets here, for example. In the present case, only eight converging lenses $18_1$–$18_n$ and eight deflection mirrors 20 are thus swept over such that accordingly only eight perforation tracks 26 result in the substrate 10.

As can be recognized with reference to FIG. 2, the rotating polygonal mirror 16 can, for example, be accordingly adjusted by means of a motorized drive 28.

The regions 16', 16" having a different number of facets can be provided on a joint axis A or can also have at least partly differing axes of rotation A. At least partly differing drives can also be associated with the regions 16', 16" in this process.

Figure 3:
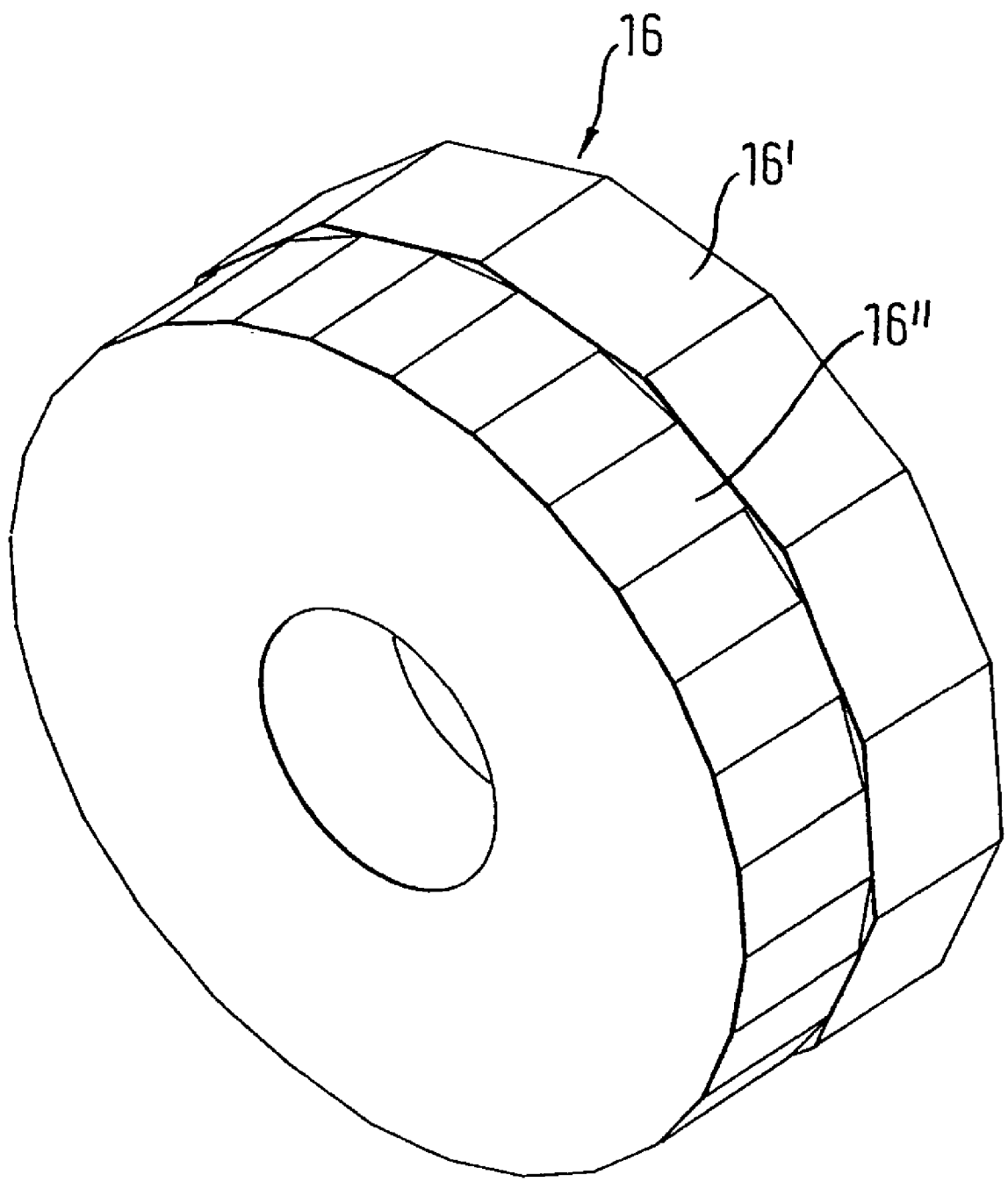
FIG. 3 shows an enlarged representation of a further embodiment of a rotating polygonal mirror having two regions of a different number of facets.

FIG. 3 shows, in an enlarged representation, a further embodiment of a rotating polygonal mirror 16 having two regions 16', 16" of a different number of facets. In the present case, a much higher number of facets is provided than in the previously described embodiments.

In the embodiment shown by way of example in FIG. 3, the two regions 16', 16" are again located on a common axis. Generally, however, the regions 16', 16" having a different number of facets can again also have different axes of rotation here and/or can be driven by separate drives.

Figure 4:
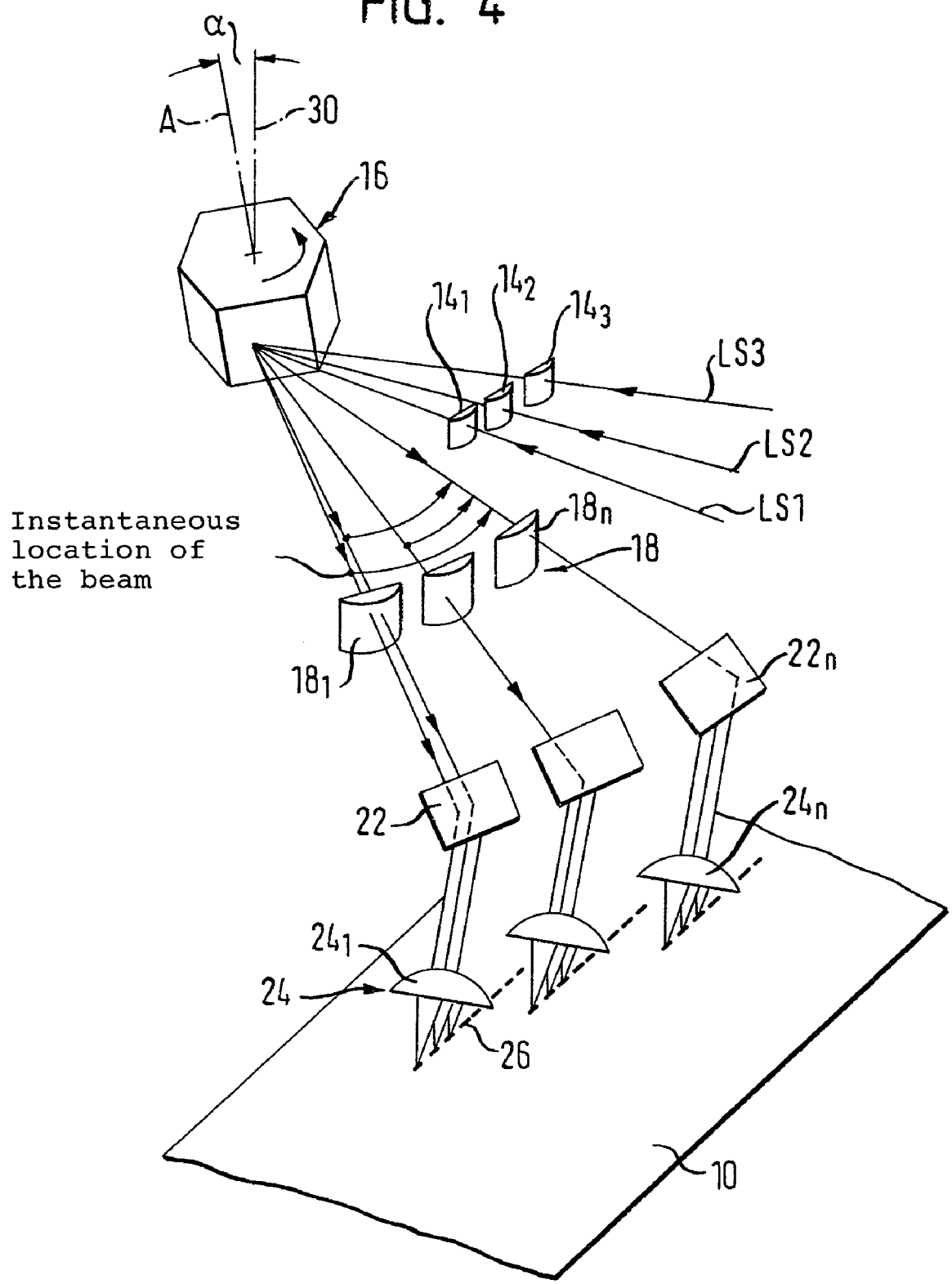
FIG. 4 is a schematic simplified representation of a further embodiment of an apparatus for substrate treatment by means of laser radiation, in which at least one further incident light beam can be reflected via the rotating polygonal mirror, with beam paths offset in time resulting for the different laser beams.
Figure 5:
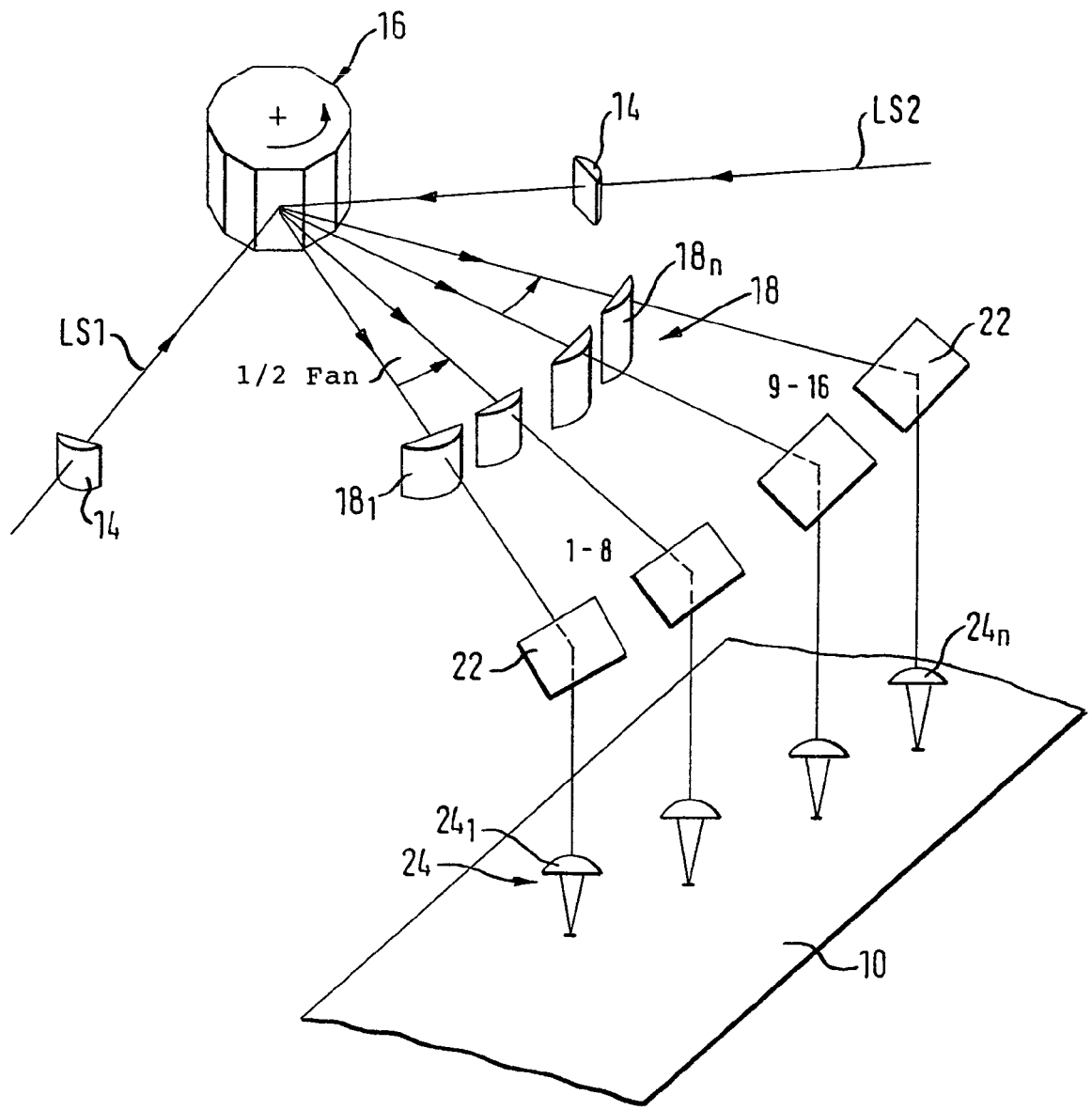
FIG. 5 is a schematic, simplified representation of a further embodiment of an apparatus for substrate treatment by means of laser radiation, in which different reflected laser beams sweep over different part sections of the arrangement of converging lenses arranged at a spacing from the substrate corresponding precisely or approximately to their focal lengths.
Figure 6:
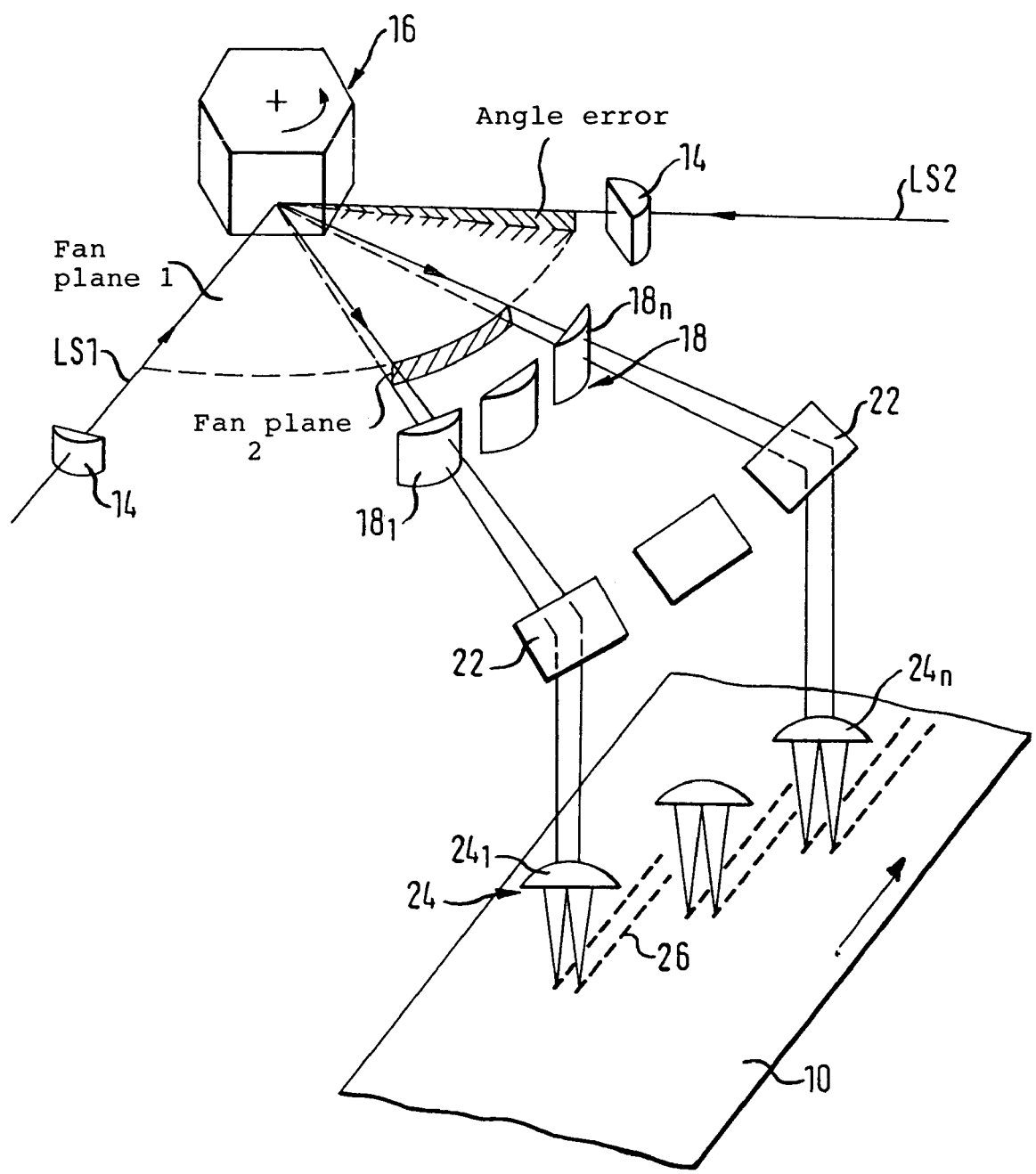
FIG. 6 is a schematic, simplified representation of a further embodiment of an apparatus for substrate treatment by means of laser radiation, in which different reflected laser beams lie in different sweep planes or fan planes.

FIGS. 4 to 6 each show in a schematic, simplified representation further embodiments of an apparatus for substrate treatment by means of laser radiation in which at least one further incident laser beam can be reflected via the rotating polygonal mirror 16 in order to correspondingly increase the number of the perforation tracks 26 produced in the substrate 10 and/or the perforation density in a respective perforation track 26.

In the embodiment in accordance with FIG. 4, the reflected laser beams lie in the same sweep plane or fan plane. The same beam paths result for the different laser beams, but offset in time.

In the present case, in addition to a first laser beam LS1, at least one further laser beam LSi is reflected via a beam multiplexer formed e.g. by a rotating polygonal mirror 16. In FIG. 4, only two further laser beams LS2 and LS3 are, for example, shown. Generally, however, a different number of additional laser beams is also possible.

The further laser beam(s) can be located, for example, in the same beam plane which is formed by the first incident laser beam LS1 and by the beam fan set up by the rotating polygonal mirror 16. In this case, no angular deviation would therefore be present between the beam fans of the different laser beams.

Depending on the reflection point set, i.e. on the point of incidence of the incident laser beams on the polygonal surface, an offset of the instantaneously exposed or overswept converging or collimator lenses $18_1$–$18_n$ or converging or focusing lenses $24_1$–$24_n$ results for every incident beam. One or more incident laser beams can thus also use the beam multiplexer or rotating polygonal mirror 16 without any further effort, whereby a manually adjustable multiplication or a multiplication adjustable by motor of the laser working pulses offset in time is achieved, considered for one single beam path. Perforation holes with a multiple number and with an adjustable spacing can therefore be produced by one single beam path.

A beam path has to receive correspondingly more beams for the corresponding multiplication of the number of holes so that the adjustment possibilities are coupled to one another (not independently adjustable). The increase in the hole frequency is, however, synchronized with an adjustable spacing within a track. A corresponding switching is in particular also possible in operation. A corresponding embodiment is in particular suitable as a hole doubler for a fixed number of tracks. The control can in particular take place via corresponding software.

The instantaneous location of the different laser beams is dependent on the offset on the reflecting facet.

To better arrange the different incident light beams and with respect to an easier adjustability, it can be expedient if at least some of the incident laser beams form a plane which is tilted with respect to the plane of the respective laser beams reflected at the rotating polygonal mirror 16. As with the embodiments already described above in accordance with FIGS. 1 and 2, the axis of rotation of the rotating polygonal mirror 16 or of a respective mirror region 16', 16" can thus also be correspondingly tilted here. The axis of rotation A of the rotating polygonal mirror 16 can, for example, as indicated in FIG. 4, thus be tilted by an angle α with respect to the perpendicular 30 to the plane formed by the incident laser beams LS1 to LS3, which has the result that the plane in which the incident laser beams LS1 to LS3 are located exits the fan plane of the beams reflected by the rotating polygonal mirror 16 at an angle 2α. With such a tilting of the respective polygonal axis of rotation, frequently expedient for reasons of space, the incident beams can be arranged better and the beam paths can be adjusted more easily. A more compact arrangement is achieved overall.

In particular a rotating polygonal mirror 16 with at least two regions 16' 16" having a different number of facets (cf. FIGS. 1 to 3) can also be used as a beam multiplexer here.

The apparatus can also again have at least substantially the same design in another respect as was described in connection with FIGS. 1 to 3. The same reference numerals have been associated with parts corresponding to one another.

FIG. 5 shows an embodiment of the apparatus for substrate treatment by means of laser radiation in which different reflected laser beams LS1, LS2 sweep over different part sections of the arrangement 18 of collimator lenses $18_1$–$18_n$ or of the arrangement 24 of focusing lenses $24_1$–$24_n$.

A conventional beam multiplexer 16 or rotating polygonal mirror 16 or e.g. a rotating polygonal mirror 16 shown in FIGS. 1 to 3 can, for example, again be used in this process.

Sixteen collimator lenses are, for example, associated with a conventional beam multiplexer so that a maximum of sixteen focusing lenses are available. In the present case, however, only one rotating polygonal mirror 16 is used to sweep over only eight collimator lenses $18_1$–$18_n$ or focusing lenses $24_1$–$24_n$. The advantage achieved with this consists of the fact that, in view of the doubled number of facets, the pulse frequency or hole frequency doubles with the same technically realizable maximum speed of rotation of the rotating polygonal mirror 16. However, this only applies to eight perforation tracks in the present case. The total number of holes remains the same.

This disadvantage is, however, compensated for by means of a second laser beam LS2 incident onto one and the same rotating polygonal mirror 16 such that a real doubling of the pulse frequency or perforation frequency is achieved for e.g. all sixteen beams by the use of the second laser beam LS2.

The number of holes is multiplied or doubled, with the beams and/or the focusing lenses being adjustable independently of one another here. A corresponding synchronization results. After a plurality of beams, here two beams, have been adjusted together on one track, the apparatus is in particular suitable for the multiplication of holes, i.e. e.g. the doubling of holes. The apparatus is thus suitable as a doubler of the number of tracks using, for example, a further laser. A switching is in particular again also possible in operation. The control can in particular also again take place via corresponding software here.

As already mentioned, in particular a rotating polygonal mirror 16 having regions of a different number of facets can again also be used as the beam multiplexer (cf. e.g. FIGS. 1 to 3). The apparatus can also again have at least substantially the same design in another respect as was described in connection with FIGS. 1 to 3. In this case, too, the axis of rotation of the rotating polygonal mirror 16 or of a respective mirror region 16', 16" can again be tilted as described e.g. in connection with FIG. 4. The same reference numerals have been associated with parts corresponding to one another.

FIG. 6 shows in a schematic simplified representation a further embodiment of an apparatus for substrate treatment by means of laser radiation, with in this case the differently reflected laser beams lying at least partly in different sweep planes or fan planes.

At least one further laser beam (here e.g. a second laser beam LS2) can thus again be reflected, for example, via a conventional beam multiplexer or rotating polygonal mirror 16. The further laser beam(s) do not lie, or do not partly lie, in the same beam plane which is formed by the first incident laser beam LS1 and the beam reflected by the rotating polygonal mirror 16. In this case, there is therefore an angular deviation between the beam planes of all or of some incident laser beams. Each laser beam incident at a different angle sets up its own fan plane in a slightly angle tilted manner after reflection at the rotating polygonal mirror 16. As e.g. in the embodiment in accordance with FIG. 4, depending on the set reflection point or on the point of incidence of the incoming laser beams on the polygon surface, an offset of the instantaneously exposed or swept over collimator lenses $18_1$–$18_n$ or focusing lenses $24_1$–$24_n$ results for each incident laser beam which can lie between 0° and the full fan angle.

One or more further incident laser beams incident at a slightly tilted angle can thus also use the beam multiplexer including e.g. a rotating polygonal mirror 16 without any further effort, whereby a manually adjustable multiplication or a multiplication adjustable by motor, here e.g. a doubling, of the laser working pulses offset in time is achieved, considered for one single beam path. Perforation holes can therefore be produced by one single beam path with a multiple number, e.g. double the number, and with an adjustable spacing. The multiplied holes or doubled holes are not arranged in line with the original row of perforations in dependence on slightly different angles of incidence and in dependence on the focal length of the respective focusing lens. In particular a track multiplication, e.g. a track doubling, can thus be achieved with this embodiment.

For the better separation of the multiplied or doubled tracks, it can be necessary for angular differences in the region of several degrees to use larger diameters for the collimator lenses $18_1$–$18_n$ or the focusing lenses $24_1$–$24_n$ and deflection mirrors, here for example the mirrors 24, or at least one further plane having the same collimator lenses and deflection mirrors and, optionally, also focusing lenses as for the first normal beam LS1 in order to accommodate the additional beam planes in space.

In particular a rotating polygonal mirror 16 having regions of a different number of facets can again also be used as the beam multiplexer (cf. e.g. FIGS. 1–3).

This embodiment can also again have at least substantially the same design in another respect as was described in connection with FIGS. 1 to 3. The tilting of the axis of rotation of the rotating polygonal mirror 16 or of a respective mirror region 16', 16" described inter alia in connection with FIGS. 4 and 5 is generally also conceivable here. The same reference numerals have been associated with parts corresponding to one another.

The number of holes can therefore be multiplied and, for example, doubled. The beams and/or focusing lenses, etc. are separate or partly adjustable or only adjustable together depending on the version. A corresponding synchronization results, and indeed depending on the version, in multiplied, e.g. doubled, rows up to multiplied tracks with individually adjustable hole positions, if complete individual beams are set up which are adjustable fully independently for each additional optical fan after reflection at the common rotating polygonal mirror 16. An extremely universal apparatus results with a minimum effort. It can in particular also be switched in operation. The control can in particular take place via corresponding software.

As already indicated, any desired combinations of the different embodiments and/or their features are generally also conceivable.

The invention claimed is:

1. An apparatus for substrate treatment by means of laser radiation comprising a rotating polygonal mirror by which at least one laser beam incident as a continuous laser light is reflected and is swept over an arrangement of converging lenses which lie next to one another and which are arranged at a spacing corresponding precisely or approximately to their focal lengths from the moved substrate, which is in particular formed by a material web, wherein the incident laser beam is focused onto the rotating polygonal mirror and the reflected laser light is first collimated again subsequent to the rotating polygonal mirror, wherein the rotating polygonal mirror is divided into at least two regions of the same diameter having a different number of facets; and wherein the rotating polygonal mirror is adjustable such that different regions are introducible into the beam path of the laser radiation and accordingly result in different sweep angles or fan angles of the laser beam reflected by the rotating polygonal mirror, the laser beam corresponding to a perforation track on the substrate.

2. An apparatus in accordance with claim 1, wherein the rotating polygonal mirror is adjusted by means of a positioning device actuatable by motor or manually.

3. An apparatus in accordance with claim 1, wherein the regions having a different number of facets are arranged behind one another in the direction of the axis of rotation A of the rotating polygonal mirror; and wherein the rotating polygonal mirror is adjustable in the direction of this axis of rotation.

4. An apparatus in accordance with the claim 1, wherein the rotating polygonal mirror is assembled from plates by which the regions having a different number of facets are formed.

5. An apparatus in accordance with claim 1, wherein the rotating polygonal mirror is made in one piece.

6. An apparatus in accordance with claim 1, wherein the rotating polygonal mirror is adjustable during the operation of the apparatus.

7. An apparatus in accordance with claim 1, wherein the incident laser beam is focused onto the rotating polygonal mirror by a lens; and wherein a further arrangement of converging lenses which lie next to one another and which are arranged at a spacing from the rotating polygonal mirror corresponding precisely or approximately to their focal lengths is provided between the rotating polygonal mirror and the arrangement of converging lenses lying next to one another and arranged at a spacing from the substrate corresponding precisely or approximately to their focal lengths.

8. An apparatus in accordance with claim 7, wherein the lenses between which the rotating polygonal mirror lies are spherical and/or cylindrical converging lenses.

9. An apparatus in accordance with claim 7, wherein deflection mirrors are arranged between the two arrangements of converging lenses lying next to one another.

10. An apparatus in accordance with claim 1, wherein the regions having a different number of facets have at least partly differing axes of rotation and/or in that at least partly differing drives are associated with these regions.

11. An apparatus in accordance with claim 1, wherein the axis of rotation of the rotating polygonal mirror or of a respective region is tilted with respect to the plane perpendicular to the incident laser beam.

12. An apparatus for substrate treatment by means of laser radiation comprising a rotating polygonal mirror by which a first laser beam incident as a continuous laser light is reflected and is swept over an arrangement of converging lenses which lie next to one another and which are arranged at a spacing corresponding precisely or approximately to their focal lengths from the moved substrate, which is formed by a material web, wherein the incident laser beam is focused onto the rotating polygonal mirror and the reflected laser light is first collimated again subsequent to the rotating polygonal mirror, wherein at least one further incident laser beam is configured to be reflected via the rotating polygonal mirror in order to accordingly increase the number of perforation tracks produced in the substrate and/or the perforation density in a respective perforation track.

13. An apparatus in accordance with claim 12, wherein a switch can be made between different modes of operation of a different number of reflected laser beams.

14. An apparatus in accordance with claim 12, wherein the laser beams reflected via the rotating polygonal mirror lie at least partly in a common sweep plane or fan plane adjoining the rotating polygonal mirror.

15. An apparatus in accordance with claim 12, wherein at least some of the incident laser beams form a plane which is tilted with respect to the plane of the respective laser beams reflected at the rotating polygonal mirror.

16. An apparatus in accordance with claim 12, wherein the different incident laser beams are configured to be incident at least partly onto different reflection points of the rotating polygonal mirror.

17. An apparatus in accordance with claim 12, wherein the reflection points onto which the incident laser beams are incident on the rotating polygonal mirror are adjustable.

18. An apparatus in accordance with claim 12, wherein the perforation spacing in a respective perforation track is adjustable.

19. An apparatus in accordance with claim 12, wherein the number of facets of the rotating polygonal mirror has been selected such that only a respective part section of the arrangement of converging lenses lying next to one another and arranged at a spacing from the substrate corresponding to their focal lengths is swept over by a respective reflected laser beam, with the different reflected laser beams sweeping over different part sections of this lens arrangement.

20. An apparatus in accordance with claim 12, wherein the laser beams reflected via the rotating polygonal mirror lie at least partly in a common sweep plane or fan plane adjoining the rotating polygonal mirror.

21. An apparatus in accordance with claim 12, wherein the laser beams reflected via the rotating polygonal mirror lie at least partly in different sweep planes or fan planes adjoining the rotating polygonal mirror.

22. An apparatus in accordance with claim 12, wherein at least one further arrangement of converging lenses lying next to one another and arranged at a spacing from the rotating polygonal mirror corresponding to their focal lengths is provided between the rotating polygonal mirror and the arrangement of converging lenses lying next to one another and arranged at a spacing from the substrate corresponding precisely or approximately to their focal lengths.

23. An apparatus in accordance with claim 22, wherein the lenses between which the rotating polygonal mirror lies are spherical and/or cylindrical converging lenses.

24. An apparatus in accordance with claim 22, wherein deflection mirrors are arranged between the two arrangements of converging lenses lying next to one another.

* * * * *